US 8,055,784 B2

(12) United States Patent
Kalama et al.

(10) Patent No.: US 8,055,784 B2
(45) Date of Patent: Nov. 8, 2011

(54) CONTENT NAVIGATION MODULE FOR MANAGING DELIVERY OF CONTENT TO COMPUTING DEVICES AND METHOD THEREFOR

(75) Inventors: Asa Kalama, South Pasadena, CA (US); Frank Mezzatesta, Jr., Glendale, CA (US); William McArdle, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 407 days.

(21) Appl. No.: 12/217,726

(22) Filed: Jul. 7, 2008

(65) Prior Publication Data

US 2010/0005137 A1 Jan. 7, 2010

(51) Int. Cl.
*G06F 15/16* (2006.01)
(52) U.S. Cl. .......... 709/231; 709/213; 709/227; 725/37; 725/87; 725/88
(58) Field of Classification Search .................. 709/231, 709/213, 227; 725/37, 87, 88
See application file for complete search history.

(56) References Cited

U.S. PATENT DOCUMENTS

| | | | | |
|---|---|---|---|---|
| 5,949,799 A * | 9/1999 | Grivna et al. | ................. | 714/749 |
| 6,463,486 B1 * | 10/2002 | Parry et al. | ...................... | 710/52 |
| 6,728,776 B1 * | 4/2004 | Colbath | ........................ | 709/231 |
| 7,281,274 B2 * | 10/2007 | Manning et al. | ................ | 726/31 |
| 7,465,231 B2 * | 12/2008 | Lewin et al. | ..................... | 463/37 |
| 7,577,768 B2 * | 8/2009 | Ohnishi | .......................... | 710/15 |
| 7,653,737 B2 * | 1/2010 | Colbath | ........................ | 709/231 |
| 2001/0044851 A1 * | 11/2001 | Rothman et al. | ............... | 709/231 |
| 2002/0158878 A1 * | 10/2002 | Smirnov et al. | ................ | 345/545 |
| 2003/0115352 A1 * | 6/2003 | Picraux | .......................... | 709/231 |
| 2003/0236905 A1 * | 12/2003 | Choi et al. | ...................... | 709/231 |
| 2004/0221011 A1 * | 11/2004 | Smith et al. | .................... | 709/206 |
| 2005/0138112 A1 * | 6/2005 | Sagar et al. | ..................... | 709/203 |
| 2005/0261062 A1 * | 11/2005 | Lewin et al. | ..................... | 463/42 |
| 2006/0136964 A1 * | 6/2006 | Diez et al. | ........................ | 725/37 |
| 2006/0235866 A1 * | 10/2006 | Park | ............... | 707/101 |
| 2006/0242315 A1 * | 10/2006 | Nichols | ......................... | 709/231 |
| 2006/0265511 A1 * | 11/2006 | Riggs et al. | .................... | 709/231 |
| 2006/0287110 A1 | 12/2006 | Klitsner et al. | | |
| 2007/0022208 A1 * | 1/2007 | Hashimoto et al. | ........... | 709/231 |
| 2007/0065122 A1 * | 3/2007 | Chatterton | ..................... | 386/126 |

(Continued)

OTHER PUBLICATIONS

Schulzrinne, H. et al., "Reat Time Streaming Protocol (RTSP)," Network Working Group, Request for Comments: 2326, Apr. 1998, p. 77.*

*Primary Examiner* — Alina N. Boutah
(74) *Attorney, Agent, or Firm* — Farjami & Farjami LLP

(57) ABSTRACT

There is provided a method for use by a content navigation module for managing delivery of content. The method comprising communicating an identifier contained in the content navigation module with a first computing device to enable the first computing device to receive a selected content from a presentation server over a network; receiving a delivery progress of the selected content from the first computing device periodically; storing the delivery progress of the selected content; losing communication with the first computing device after storing the delivery progress; and communicating the identifier contained in the content navigation module and the delivery progress of the selected content with a second computing device to enable the second computing device to resume receiving the selected content from the server over the network according to the delivery progress of the selected content stored in the content navigation module.

11 Claims, 5 Drawing Sheets

U.S. PATENT DOCUMENTS

| | | | |
|---|---|---|---|
| 2007/0088801 A1* | 4/2007 | Levkovitz et al. | 709/217 |
| 2007/0155204 A1 | 7/2007 | Klitsner et al. | |
| 2007/0198656 A1* | 8/2007 | Mazzaferri et al. | 709/218 |
| 2008/0092181 A1* | 4/2008 | Britt | 725/87 |
| 2008/0124053 A1* | 5/2008 | Hutten | 386/124 |
| 2008/0131086 A1* | 6/2008 | Hutten | 386/109 |
| 2009/0017827 A1* | 1/2009 | Perry et al. | 455/445 |
| 2009/0100182 A1* | 4/2009 | Chaudhry | 709/229 |
| 2009/0187670 A1* | 7/2009 | Lee | 709/231 |
| 2009/0228823 A1* | 9/2009 | Edwards et al. | 715/772 |
| 2009/0300231 A1* | 12/2009 | Munetsugu | 710/33 |
| 2010/0057884 A1* | 3/2010 | Brownell et al. | 709/219 |
| 2010/0121664 A1* | 5/2010 | Baier et al. | 705/7 |
| 2010/0198943 A1* | 8/2010 | Harrang et al. | 709/217 |
| 2011/0191163 A1* | 8/2011 | Allaire et al. | 705/14.39 |

\* cited by examiner

CONTENT NAVIGATION MODULE FOR MANAGING DELIVERY OF CONTENT TO COMPUTING DEVICES AND METHOD THEREFOR

BACKGROUND OF THE INVENTION

1. Field of the Invention

The present invention relates generally to the distribution of electronic content. More particularly, the present invention relates to computer mediated delivery of electronic content.

2. Background Art

Personal computers (PCs) are now to be found nearly everywhere and are used by almost everyone. What was not long ago an exotic and primarily personal possession has grown to be so common and so widely used as to have become a staple of modern communication. In the highly mobile, wired culture of today, PCs are typically available for public use in many venues where use of a truly personal communication device might be inconvenient, costly, or forbidden. As a result, public PCs have assumed a role in modern society corresponding to that of the public telephone during a now largely bygone era.

In addition to the proliferation of publicly shared PCs, the communication environment of today is populated by a dizzying variety of extremely portable mobile communication devices. Many of these highly portable mobile devices also possess substantial computing power, enabling them to replicate some of the functions performed by bulkier PCs. The presence of these multifunctional mobile devices, together with the prevalence of publicly accessible PCs, has contributed to the dispersion of traditionally personal computing activities, from a single, often home-based, computing system, to multiple independent systems, some of which may be shared by other users.

One of the benefits flowing from the dispersion of computing functionality from a single system to numerous highly portable or publicly available systems is that access to rich content, such as streaming content available from a server-based content provider, is more accessible than ever before. A user need not wait until returning home, or even until finding adequate space in a public environment to setup a personal workstation, in order to access and enjoy content available over the Internet, for example. Consequently, a commuter enduring a tedious trip, or a business traveler suffering through an all too common airport or other transit hub delay, can, in principle, alleviate the stress and unpleasantness of their immediate circumstances through the diversion available from content accessible online.

The benefits of being able to access content from many diverse locations, using a variety of computing devices may be substantially offset, however, by the increased burden resulting from the technological proficiency required to use multiple computing devices in this way. For example, access to desired online streaming content may require that a user launch a web browser local to the particular computing device being used, navigate to a web address from which the content is provided, and interact with a remote media player to control delivery and presentation of selected content. In addition, in situations in which a user owns multiple computing devices, or uses a shared or public system for the first time, drivers and other software required for interoperability with a particular media player may have to be downloaded and installed to enable each of the computing devices to interact with the available content.

Moreover, because conventional approaches to enabling access to content typically localize the relevant drivers, control application, and user history to a particular computing device, it may be inconvenient or even impossible to enjoy a single lengthy presentation across more than one computing device. For example, a business traveler viewing a streaming television episode on a public PC provided at an airport, while awaiting a departure perhaps, may wish to interrupt the presentation to board a flight, and then resume viewing the episode at a later time using a personal communication device. Because the conventional approach to enabling access to content localizes and identifies a viewing session with the particular computing device used—in this case a public PC—the user has no convenient way to resume enjoyment of the content at the place he or she left off.

An attempt to resume viewing of the episode at a later time, using another computing device, might require the user to begin the presentation anew, or to remember and locate the point at which the earlier presentation session was interrupted, and try to adjust the presentation to begin at that point. As a result, even for a technically savvy user, accessing the available content may prove to be more inconvenient than pleasurable. For a technically naïve user, the obstacles to enjoyment may simply be overwhelming.

Accordingly, there is a need to overcome the drawbacks and deficiencies in the art by providing a solution enabling even a novice user to readily access desired content, utilizing any one of a variety of computing devices, such that information relevant to user viewing history can be recorded independently of any single computing device used to access the content, thereby enabling the user to intelligently pause-and-resume content.

SUMMARY OF THE INVENTION

A content navigation module and method, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
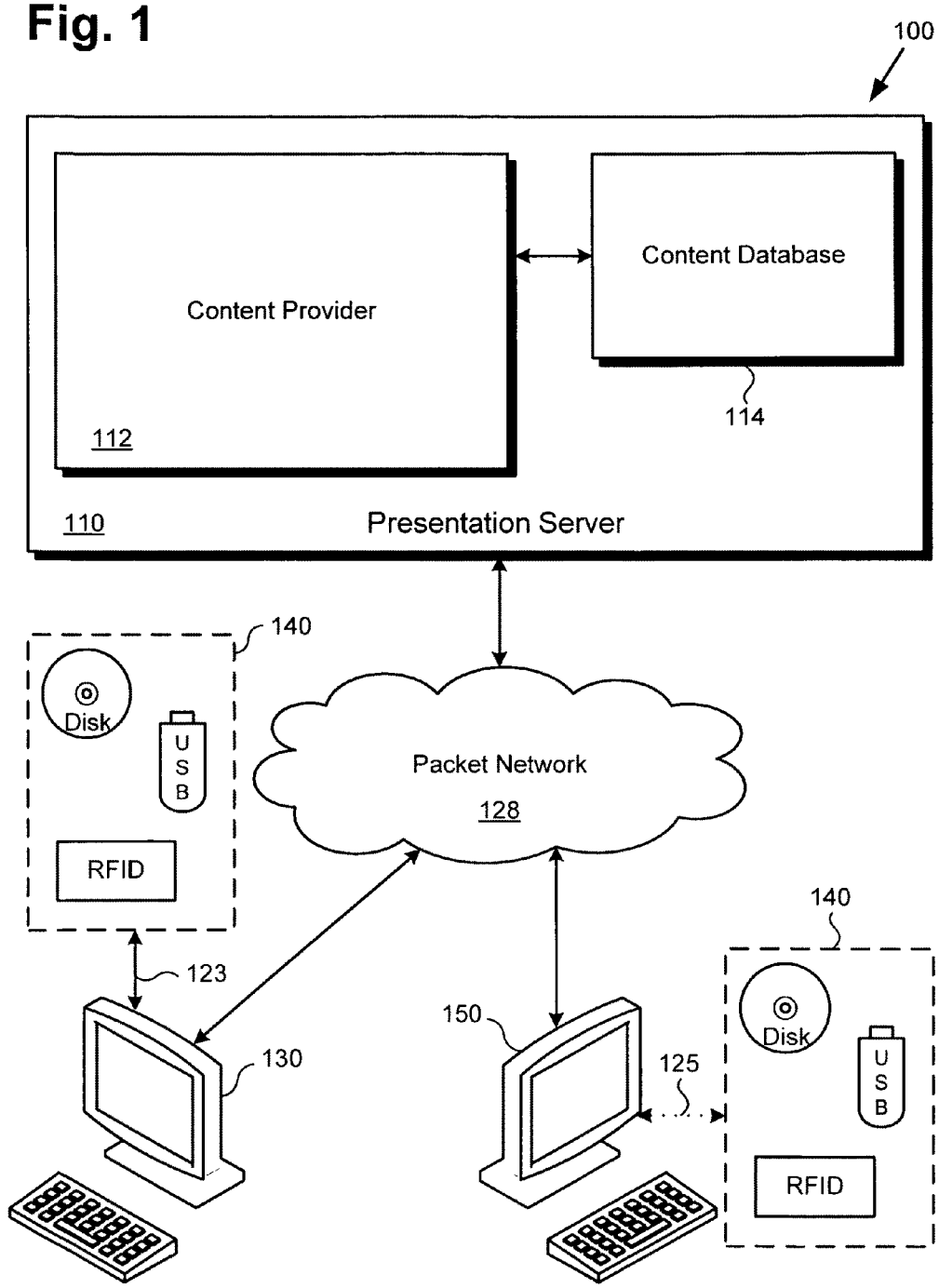
FIG. 1 shows a diagram of an exemplary content delivery system, including a content navigation module, according to one embodiment of the present invention.

The present application is directed to a content navigation module and method. The following description contains specific information pertaining to the implementation of the present invention. One skilled in the art will recognize that the present invention may be implemented in a manner different from that specifically discussed in the present application.

Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows content delivery system 100 including content navigation module 140, according to one embodiment of the present invention. In the embodiment of FIG. 1, content delivery system 100 comprises presentation server 110 including content provider 112 and content database 114, computing devices 130 and 150, and content navigation module 140. It is noted that identical content navigation module 140 appears twice in FIG. 1. The connections between content navigation module 140 and computing devices 130 and 150, shown by respective solid connection 123 and dotted connection 125, indicate that content navigation module 140 is presently connected to computing device 130, and suggest that content navigation module 140 can be connected to computing device 150 at a later time, after disconnection from computing device 130. Also shown in FIG. 1 is packet network 128.

Content navigation module 140 may be represented by alternative embodiments, as shown in FIG. 1. Content navigation module 140 may take the form of an optical disc, a device connecting to computing devices 130 and 150 through a physical interface such as a universal serial bus (USB) interface, such as a USB stick, and a device capable of connecting wirelessly with computing devices 130 and 150, for example. As further shown in FIG. 1, in one embodiment a wireless interface between content navigation module 140 and computing devices 130 and 150 may be supported, e.g., by a radio frequency identification (RFID) tag included on content navigation module 140.

According to the embodiment of FIG. 1, a user (not shown in FIG. 1) may utilize content navigation module 140 and computing device 130 to communicate with content provider 112, accessible via presentation server 110 and packet network 128. It is noted that from the standpoint of content navigation module 140 and computing devices 130 and 150, content provider 112 constitutes a remote content provider. Content provider 112 may be configured to provide a plurality of selected content available on presentation server 110, such as, for example, entertainment content, sports content, news content, instructional content, interactive shopping, and interactive games.

An identifier contained in content navigation module 140 may be used by presentation server 110 to associate selected content accessed using content navigation module 140, with content navigation module 140. In addition, the identifier may be utilized to maintain a profile for the user of content navigation module 140, that is effectively independent of computing device 130 or any other computing device utilized to access content provider 112. Such a user profile may include a record of a delivery progress for selected content items. In one embodiment, the profile may be stored server-side on content database 114, while in other embodiments, the profile may be stored on content navigation module 140. Through storage and retrieval of the profile, content navigation module 140 can be used to enable intelligent pause-and-resume of selected content. For example, a user action causing any of the plurality of selected content provided by content provider 112 to be interrupted may result in registration of a pause point and/or a resumption point for the selected content, as part of the delivery progress included in the user profile stored in content database 114.

A pause point may be registered, for example, by manually selecting a pause button on content provider 112, which can be controlled by content navigation module 140 and computing device 130. Alternatively, a pause point may be registered by disconnecting content navigation module 140 from computing device 130 prior to completion of the selected content. According to the present embodiment, the pause point and/or resumption point is associated with an identifier contained in content navigation module 140. Later use of content navigation module 140 in conjunction with another computing device, such as computing device 150 in FIG. 1, may result in resumption of the selected content at the resumption point, according to the delivery progress of the selected content. As a result, content delivery system 100 enables the user to pause the selected content started on first computing device 130, and automatically resume substantially seamless delivery of the selected content at a later time, either on first computing device 130 or on second computing device 150.

As shown in FIG. 1, content provider 112 can be accessed through packet network 128. In that instance, content provider 112 may comprise a web application, accessible over a packet network such as the Internet, for example. Alternatively, content provider 112 may reside on a server supporting a local area network (LAN), for instance, or included in another type of limited distribution network, perhaps in a theme park or resort setting. It is noted that although computing devices 130 and 150 are represented as personal computers (PCs) in FIG. 1, in one embodiment one or both of computing devices 130 and 150 may comprise a television system (TV), or a mobile communication device such as a mobile telephone, a digital media player, personal digital assistant (PDA), wireless computer, gaming console, or automobile entertainment system, for example.

Figure 2:
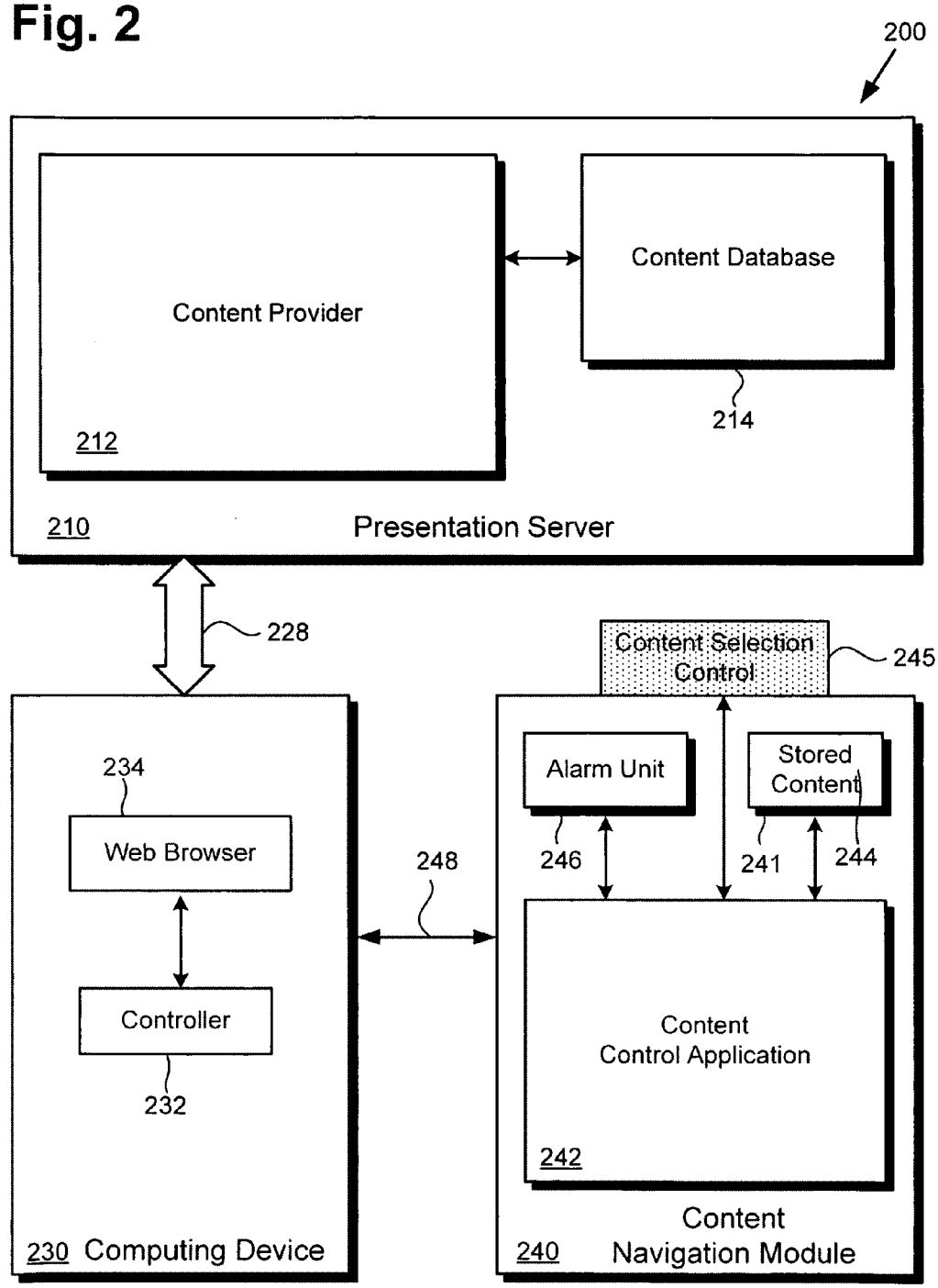
FIG. 2 shows a more detailed exemplary embodiment of a content delivery system, including a content navigation module, according to one embodiment of the present invention.

Turning now to FIG. 2, FIG. 2 shows a more detailed exemplary embodiment of content delivery system 200 including content navigation module 240. Content delivery system 200 comprises presentation server 210 including content provider 212 and content database 214, computing device 230, and content navigation module 240, corresponding respectively to presentation server 110 including content provider 112 and content database 114, computing device 130, and content navigation module 140, in FIG. 1. In the embodiment of FIG. 2, content navigation module 240 is connected to computing device 230 through interface 248. In addition, computing device 230 may be seen to be in communication with presentation server 210 through network link 228. As shown in FIG. 2, computing device 230 includes controller 232 and web browser 234. As further shown in FIG. 2, content navigation module 240 comprises content control application 242, memory 241 containing stored content 244, content selection control 245, and alarm unit 246.

It is noted that network link 228 is shown as a two-way communication, to correspond to ongoing communication between computing device 230 and presentation server 210. Interface 248 is also shown by a two-way communication arrow, indicating that in the present embodiment computing device 230 may read from and write to content navigation module 240. The extent to which computing device 230 may modify data stored on content navigation module 240 may be limited, however, so that in some embodiments computing device 230 may write data to alarm unit 246, but not to stored content 244, and vice versa. Moreover, in one embodiment content navigation module 240 may comprise read only memory (ROM) content, precluding computing device 230 from performing write operations to it.

Controller 232 may be the central processing unit for computing device 230, in which role it may run the computing device operating system, launch web browser 234, and facilitate execution of content control application 242 on content navigation module 240. Web browser 234, under the control of controller 232, may launch in response to instructions provided by content control application 242, to enable computing device 230 to interact with and control content provider 212, accessible through presentation server 210.

Content navigation module 240 may comprise a swappable computer readable medium such as an optical disc, or an external USB memory drive, for example. In one embodiment, content navigation module 240 may comprise an external memory device accessible by computing device 230 via a wireless interface, such as through a Bluetooth connection, for example. Content navigation module 240 includes content control application 242 configured to self-execute when content navigation module 240 is accessed by computing device 230. Content control application 242 is further configured to launch web browser 234 on computing device 230, navigate to content provider 212, and control delivery of a selected content provided by content provider 212.

Implementation of the embodiment of FIG. 2 enables a user of computing device 230 to access and control content provider 212 simply by connecting content navigation module 240 and computing device 230. In addition, content control application 242 enables the user to control content provider 212 to select an item of desired content for viewing, and to manage the delivery of content during a presentation session. Moreover, an identifier contained in content navigation module 240 may be registered by presentation server 210, so a profile for the user of content navigation module 240 may be maintained.

Because the user profile is associated with content navigation module 240, it may be independent of the identity of computing device 230. Consequently, a user action causing delivery of any of the plurality of selected content provided by content provider 212 to be interrupted may result in storage of a pause point and/or a resumption point as part of a delivery progress stored in media delivery management database 214. That pause point and/or resumption point, as well as the entire delivery progress of the selected content, can be associated with the identifier contained in content navigation module 240, as previously described, enabling the user to pause the selected content on a first computing device, such as computing device 230, in FIG. 2, and resume the selected content on a second computing device. It is noted that the expression "second computing device" as used herein may refer to a physically distinct computing device, or to the same computing device on which the presentation was paused. That is, in one embodiment of the present invention, the second computing device may be the first computing device used at a later time.

In addition, in the embodiment of FIG. 2, content navigation module 240 includes stored content 244, content selection control 245, and alarm unit 246. Stored content 244 may comprise, for example, a content sample corresponding to content available from content provider 212. Stored content 244 may be provided to a user of computing device 230 by content control application 242 as a substitute for streaming content, for example, in situations where network link 228 cannot be established. In one embodiment, stored content 244 may comprise bonus content, such as a music video, ad content, slideshow, for example, associated with content available from content provider 212.

Content selection control 245 may take numerous forms to enable a user to select or pre-select content available from content provider 212. Content selection control 245 may comprise a selection tool such as a slide switch or click wheel, for instance, enabling a user to select from among alternative channels of content available from presentation server 210. For example, content navigation module 240 may be configured to manage delivery of content from alternative sources such as the American Broadcasting Company (ABC) website ABC.com, an online Disney channel, and the Entertainment and Sports Programming Network (ESPN) site ESPN.com. For the sake of the present example, let us assume that content selection control 245 takes the form of a dial with three selectable positions corresponding to the alternative content sources ABC.com, the online Disney channel, and ESPN.com. The user could pre-select content from ABC.com by adjusting the dial to the ABC.com setting prior to connecting content navigation module 240 with computing device 230. Connection of the two devices would result in self-execution of content control application 242 and navigation to the content available at ABC.com.

Continuing with the present example, the user could then select content from ESPN.com by adjusting the dial to select that content source. In response, content control application 242 on content navigation module 240 could redirect computing device 230 to the selected content. In other embodiments, selectable content alternatives may be more or less specific. For example, selectable content may comprise alternative programming provided by a single programming source. In this latter example, content navigation module 240 may be dedicated solely to ABC.com content, for instance, and allow the user to select between content from the ABC television programs Desperate Housewives, Lost, and Grey's Anatomy.

Although in the present example content selection control 245 is described as a dial, in another embodiment, media selection control may be effectuated in other ways, such as by adjusting the orientation of a physical interface connecting content navigation module 240 and computing device 230. One exemplary embodiment operating in this manner might utilize content navigation module 240 in the form of a USB drive capably of being rotated with respect to the USB interface. In that instance, rotation of the drive housing to discrete positions located about an axis substantially parallel to interface 248 might correspond to selection of content.

As previously described, in some embodiments content navigation module 240 may connect with computing device 230 by means of a wireless interface, such as a radio frequency Bluetooth connection, for example. In one or more of those embodiments, content selection control 245 may enable the user to utilize content navigation module 240 to remotely control computing device 230. Moreover, in some embodiments, content navigation module 240 may include various sensors and/or actuators (not shown in FIG. 2), substantially automating some aspects of remote control. For example, one or more distance sensors may work in combination with one or more actuators and a wireless interface to automatically pause a selected content when the user leaves the room in which a first computing device displaying the selected content is located. Entry of the user into another room in which a second computing device is located may then result in automatic resumption of the selected content on the second computing device.

In some embodiments, content navigation module 240 may include contextual sensing capabilities such as environmental sensing, for example through infrared (IR) communication with a local services network. In some embodiments, content navigation module 240 may include geographic sensing capabilities, for example by comprising a Global Positioning System (GPS) receiver, for example.

Alarm unit 246, shown in FIG. 2, may produce an audible, visible, or vibratory alarm, such as a beep, tone, or flashing light, for example, or otherwise provide a user alert. In one embodiment, alarm unit 246 may comprise a screen or display capable of providing video. Alarm unit 246 may be utilized by content control application, which in some embodiments may be configured to coordinate communication of a desired notification to the user. A desired notification may be delivered as an alarm independently of connection between content navigation module 240 and computing device 230.

For example, where content navigation module 240 is used in conjunction with computing device 230 to access streaming content corresponding to television programming, a desired notification delivered as an alarm independently of connection to computing device 230 may comprise a sensory alert issued prior to a regularly scheduled television broadcast or media presentation of related content, prompting the user to view the aired presentation. In some embodiments, content navigation module 240 may not include alarm unit 246. Even in those embodiments, however, content control application 242 can be configured to coordinate communication of a desired notification to the user, such as through use of alerting resources available on computing device 230, for example.

Figure 3:
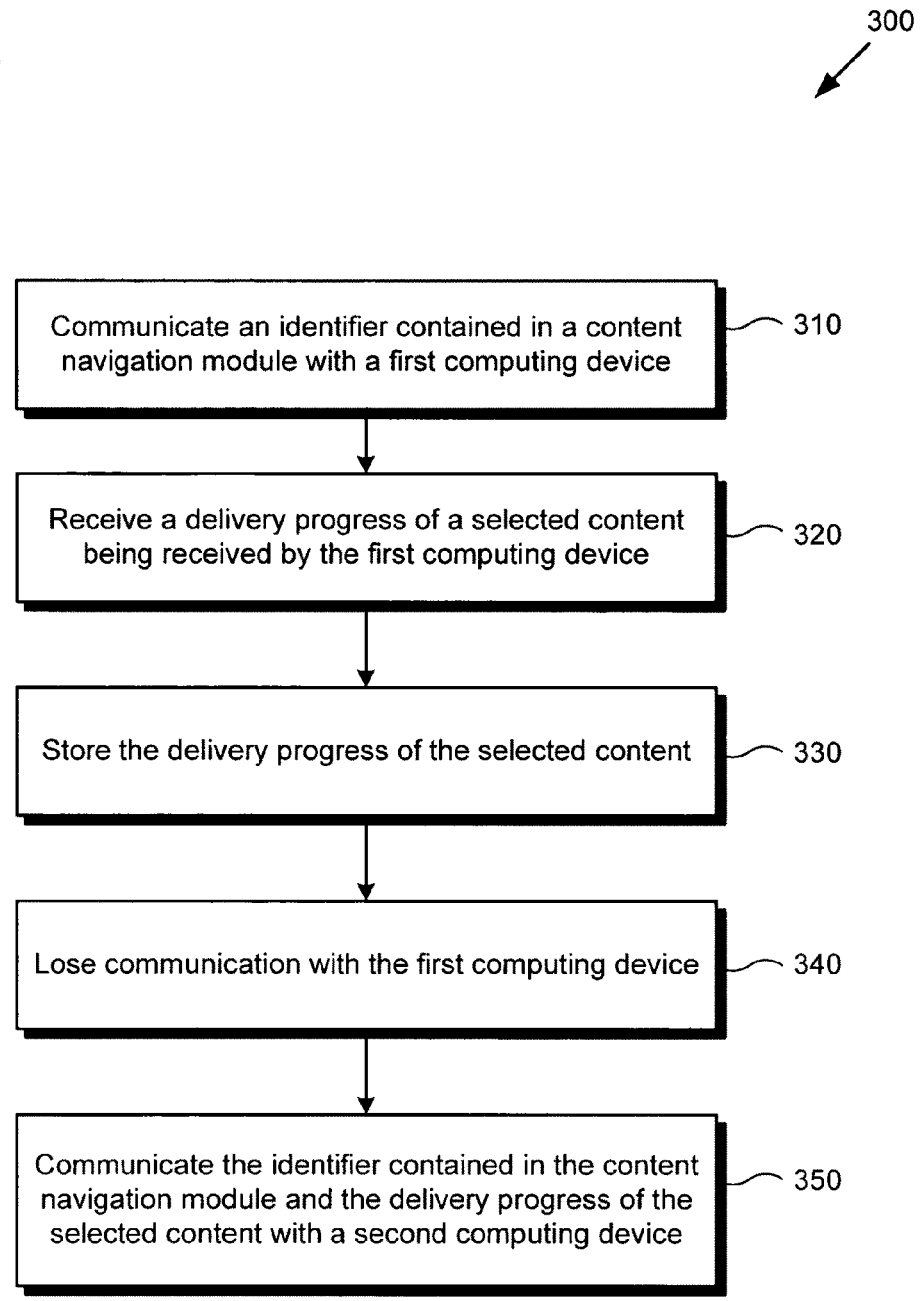
FIG. 3 is a flowchart presenting a method for use by a content navigation module for managing delivery of content, according to one embodiment of the present invention.
Figure 4:
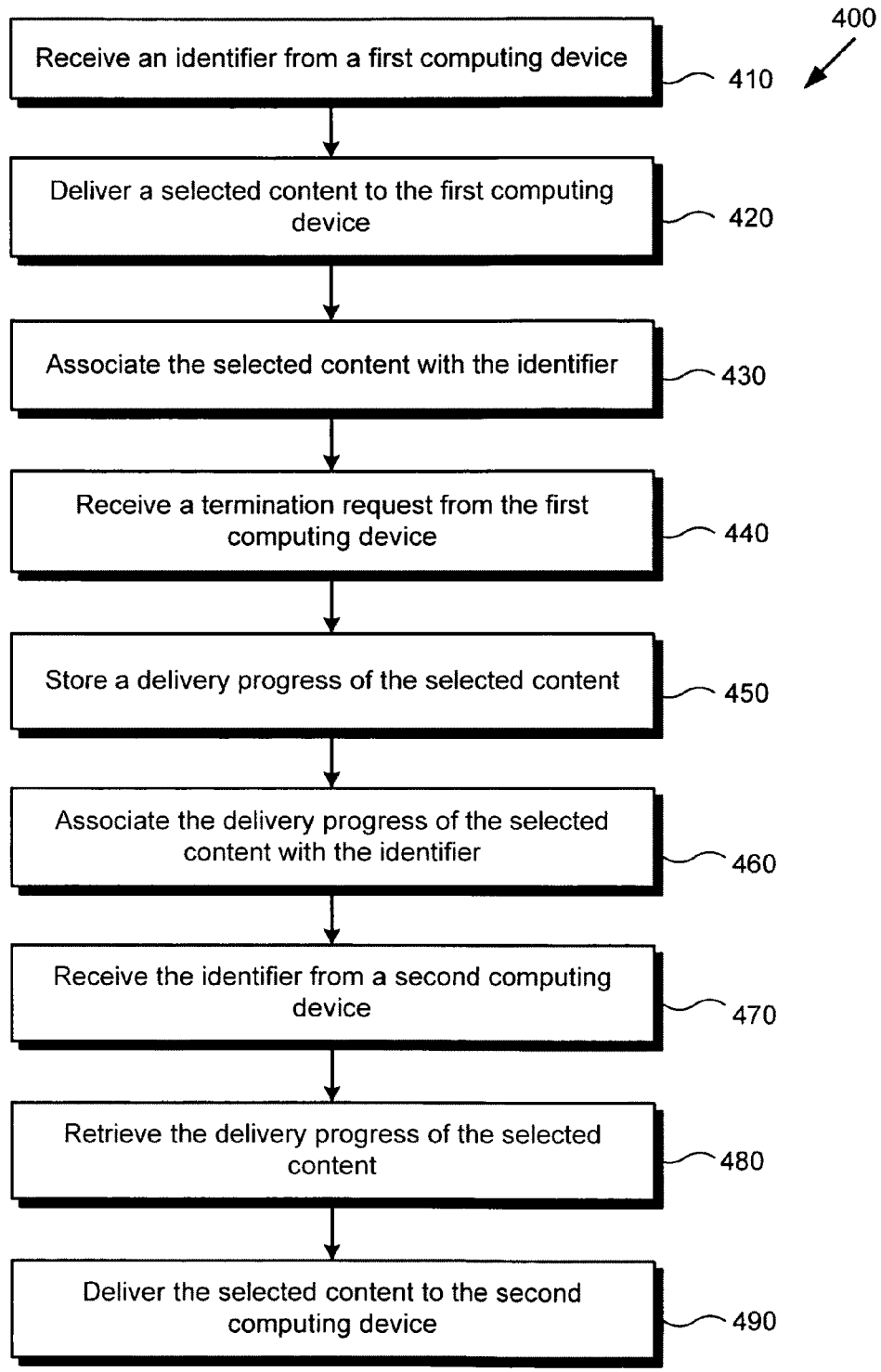
FIG. 4 is a flowchart presenting a method for managing delivery of content by a server, according to one embodiment of the present invention.

FIGS. 1 and 2 will now be further described in conjunction with FIGS. 3 and 4, which present flowcharts showing exemplary methods for managing delivery of content. FIG. 3 is a flowchart presenting a method for use by a content navigation module for managing delivery of content, according to one embodiment of the present invention, while FIG. 4 is a flowchart presenting an exemplary method for managing delivery of content by a server. Certain details and features have been left out of flowcharts 300 and 400 that are apparent to a person of ordinary skill in the art. For example, a step may consist of one or more substeps or may involve specialized equipment or materials, as known in the art. While steps 310 through 350 indicated in flowchart 300, and steps 410 through 490 indicated in flowchart 400, are sufficient to describe the present embodiments, other embodiments may utilize steps different from those shown respectively in flowcharts 300 and 400, or may include more, or fewer steps.

Beginning with step 310 in FIG. 3 and content delivery system 200 in FIG. 2, step 310 of flowchart 300 comprises communicating an identifier contained in content navigation module 240 with computing device 230. Step 310 is performed to enable computing device 230 to receive selected content from presentation server 210, over network link 228. As explained, content navigation module 240 includes a unique identifier, such as a registration number or key, for example, which may be utilized to maintain a user profile. Because the user profile is associated with content navigation module 240, it is effectively independent of the identity of computing device 230. Consequently, a user of content navigation module 240 may use that device in combination with a computing device, such as computing device 230, to access content provided by content provider 212, and enjoy continuity of presentation using other computing devices at other locations and at other times.

As has already described, content control application 242 is configured to self-execute when content navigation module 240 is connected to computing device 230. Consequently, step 310 may occur in response to connection of content navigation module 240 and computing device 230. In one embodiment, content navigation module 240 is configured to provide computing device 230 with the necessary drivers and software to support communications among computing device 230, content navigation module 240, and presentation server 210. In that embodiment, interoperability diagnostics and appropriate driver and software transfer may be performed as background operations transparent to a user as part of step 310, or as a preliminary step, for example.

The exemplary method of flowchart 300 continues with step 320, which comprises receiving a delivery progress of the selected content being received by computing device 230. The delivery progress may be monitored by presentation server 210, for example, and be received by content navigation module 240 periodically through computing device 230. It is noted that the term periodically may refer to an interval of time, such as every five seconds, for example, or it may refer to a content delivery interval measured by data transmission quantity, such as after delivery of a predetermined number of bits. Periodically receiving a delivery progress of the selected content in step 320, and subsequent storage of the delivery progress of the selected content in step 330 enables local storage of user profile information on content navigation module 240.

Flowchart 300 continues with step 340, comprising losing communication with computing device 230 after storing the delivery progress of the selected content. Step 340 may correspond to disconnection of content navigation module 240 from computing device 230, for example. Disconnection may occur in response to acts performed by the user, such as unplugging content navigation module 240 from computing device 230, failure of network link 228, or automatic interruption of interface 248 resulting due to sensors and/or actuators included on content navigation module 240, as previously described.

Referring to FIG. 1 and step 350 of flowchart 300, step 350 comprises communicating the identifier contained in content navigation module 140 and the delivery progress of the selected content with computing device 150. Step 350 corresponds to the situation shown by duplication of content navigation module 140, described in the earlier discussion directed FIG. 1. That is, the user initiates receiving a selected content using content navigation module 140 and a first computing device shown by computing device 130. The user interrupts receiving the selected content as a result of disconnection of content navigation module 140 from computing device 130. Subsequent connection of content navigation module 140 with a second computing device, shown by computing device 150, enables the second computing device to resume receiving the selected content from presentation server 110 over packet network 128, according to the delivery progress of the selected content stored on content navigation module 140.

In one embodiment, the present method may further comprise providing the user with a desired notification. Referring to FIG. 2, content navigation module 240 may receive corresponding to a desired notification from presentation server 210, and may provide the notification through content control application 242. In embodiments in which content navigation module 240 includes alarm unit 246, providing the desired notification may comprise timely activation of alarm unit 246.

Where content navigation module 240 is configured to coordinate delivery of streaming content dedicated to ABC's Desperate Housewives, for example, timely activation of alarm unit 246 may equate to providing an alarm several minutes prior to televised broadcast of the next episode. Alternatively, a user of content navigation module 240 may record a request for a desired notification on presentation server 210. The record of that request may be associated with the identifier contained in content navigation module 240, and the notification subsequently received by content navigation module 240 at an appropriate time when connectivity with presentation server 210, through a computing device such as computing device 230, is detected. A variety of desired notifications may be provided in this way. For example, a user may opt in to receipt of promotional notifications relevant to content identified as being of interest of the user. In some embodiments, notification may include informing a user of available alternative content identified as being of potential interest to the user based on the user profile, or other criteria.

Turning now to the exemplary method for managing delivery of content by a server, shown by flowchart 400 in FIG. 4, step 410 of flowchart 400 comprises receiving an identifier from a first computing device. Referring to FIG. 2, step 410 corresponds to receiving the identifier identifying content navigation module 240 over network link 228, from computing device 230. As shown in FIG. 2, content navigation module 240 is in communication with computing device 230 via interface 248.

The exemplary method of flowchart 400 continues with step 420, which comprises delivering a selected content to computing device 230. Selected content may comprise streaming content, delivered to computing device 230 over network link 228, after receiving the identifier in step 410, for example. As previously described, content control application 242 is configured to self-execute when content navigation module 240 is connected to computing device 230. Consequently, steps 410 and 420 may occur automatically, in response to connection of content navigation module 240 and client computer 230. Delivery of selected content may be accomplished by means of network link 228, over a LAN or other limited distribution network, or over packet network 128, in FIG. 1, such as the Internet, for example. As previously described, a user of content navigation module 240 may control content provider 212 using content control application 242 and a computing device, such as computing device 230. Content provider 212, which is configured to provide a plurality of selected content, can be used to stream or otherwise deliver the selected content to computing device 230 in response to a selection received from content control application 242 on content navigation module 240.

In some embodiments, one or more selection criteria may be predetermined by content control application 242. For example, content navigation module 240 may be configured to coordinate delivery of streaming content dedicated to the ABC television drama Desperate Housewives. In that embodiment, connection of content navigation module 240 to computing device 230 may result in automatic selection of the most recently aired episode of Desperate Housewives by content control application 242, resulting in streaming delivery of that selected content in step 420 without active selection by the user. In one embodiment, selection criteria may include state information recorded as part of the user profile and stored server-side on content database 214 and/or on content navigation module 240. State information may include, for example, delivery progress of a selected content as described in conjunction with FIG. 3, a media delivery history of the content navigation module, or the availability of new content added to content provider 212 since connectivity of content navigation module 240 and presentation server 210 was last detected.

In one embodiment, content navigation module 240 may be configured to coordinate delivery of any of a variety of content available from the ABC.com website, or alternative content from more than one site. In that embodiment, connection of content navigation module 240 and computing device 230 may result in display of a plurality of streaming content associated with ABC television programming being displayed to the user. According to this embodiment, an active selection or pre-selection performed by the user, perhaps by means of content selection control 245, can result in delivery of the selected content by content provider 212.

Flowchart 400 continues with step 430, comprising associating the selected content with the identifier received in step 410. Following step 440 comprises receiving a termination request from computing device 230. Step 440 may be caused by termination of the communication between computing device 230 and content navigation module 240 due to disconnection of the content navigation module 240 from computing device 230, for example. Then, in step 450, a delivery progress of the selected content is stored in response to receiving the termination request. Storing the delivery progress may correspond to recording the delivery progress in content database 214, for example. Association of the delivery progress with the identifier in step 460 allows the delivery progress to be incorporated into a user profile linked to the identifier. Updating of the user profile in this way preserves a record of the present state of the media delivery history of the content navigation module, and renders that history independent of the particular computing device utilized to access the content. Alternatively, in some embodiments hardware identification of one or more computing devices utilized by the user may be included in the user profile, together with delivery progress tied to each individual computing device.

Moving on to step 470 of flowchart 400 and referring to FIG. 1, step 470 comprises receiving the identifier from a second computing device, such as computing device 150. Receipt of the identifier from second computing device 150 enables retrieval, in step 480, of the delivery progress previously associated with the identifier and stored server-side. As a result, at step 480, presentation server 110 can deliver the selected content to computing device 150 according to the delivery progress associated with the identifier. As previously reiterated, because the delivery progress is associated with content navigation module 140 through its unique identifier, it can be independent of the identity of computing device 130. Consequently, a user of content navigation module 140 may use that device to access content provided by content provider 212, and enjoy continuity of presentation independent of the particular computing device utilized to initiate delivery of the selected content from presentation server 110. In other words, because the delivery progress is associated with content navigation module 140, rather than computing device 130, the present method enables intelligent pause-and-resume of a selected content across two, or more, computing devices, such as computing device 130 and computing device 150.

In one embodiment, the present method may further comprise sending a desired notification to the content navigation module. Referring to FIG. 2, presentation server 210 may provide a notification requested by a user of content navigation module 240 through content control application 242. In embodiments in which content delivery module 240 includes alarm unit 246, sending a desired notification may comprise providing content navigation module 240 with data necessary for timely activation of alarm unit 246.

In one embodiment, a user of content navigation module 240 may record a request for a desired notification on presentation server 210. The record of that request may be associated with the identifier contained in content navigation module 240, and the notification subsequently sent by presentation server 210 at an appropriate time when connectivity with content navigation module 240 is detected. A variety of desired notifications may be provided in this way. For example, a user may opt in to receipt of promotional notifications relevant to content identified as being of interest of the user based on the user profile. In some embodiments, notification may include informing a user of available alternative content identified as being of potential interest to the user based on the user profile, or other criteria. In one embodiment, notification may include making a user aware that he or she has missed an episode of serial content, perhaps based on the user profile and delivery progress stored either server-side or on content navigation module 240.

According to one embodiment, the present method may further comprise supplementing stored content 244 on content navigation module 240. Content control application may 242 may register consumption of stored content 244, and request replacement content from presentation server 210, for example. As previously explained, stored content 244 may comprise, for example, a content sample corresponding to content available in a selected content from content provider 212, or bonus content associated with content available from content provider 212. Stored content 244 may be presented to a user of computing device 230 by content control application 242 as a substitute for streaming content, for example, in situations where communication with presentation server 210 cannot be established. In some embodiments, for instance, content control application 242 may be configured to periodically request an update to or replace of stored content 244 from presentation server 210, in order to maintain continuity with and relevance to content presently available from content provider 212.

Figure 5:
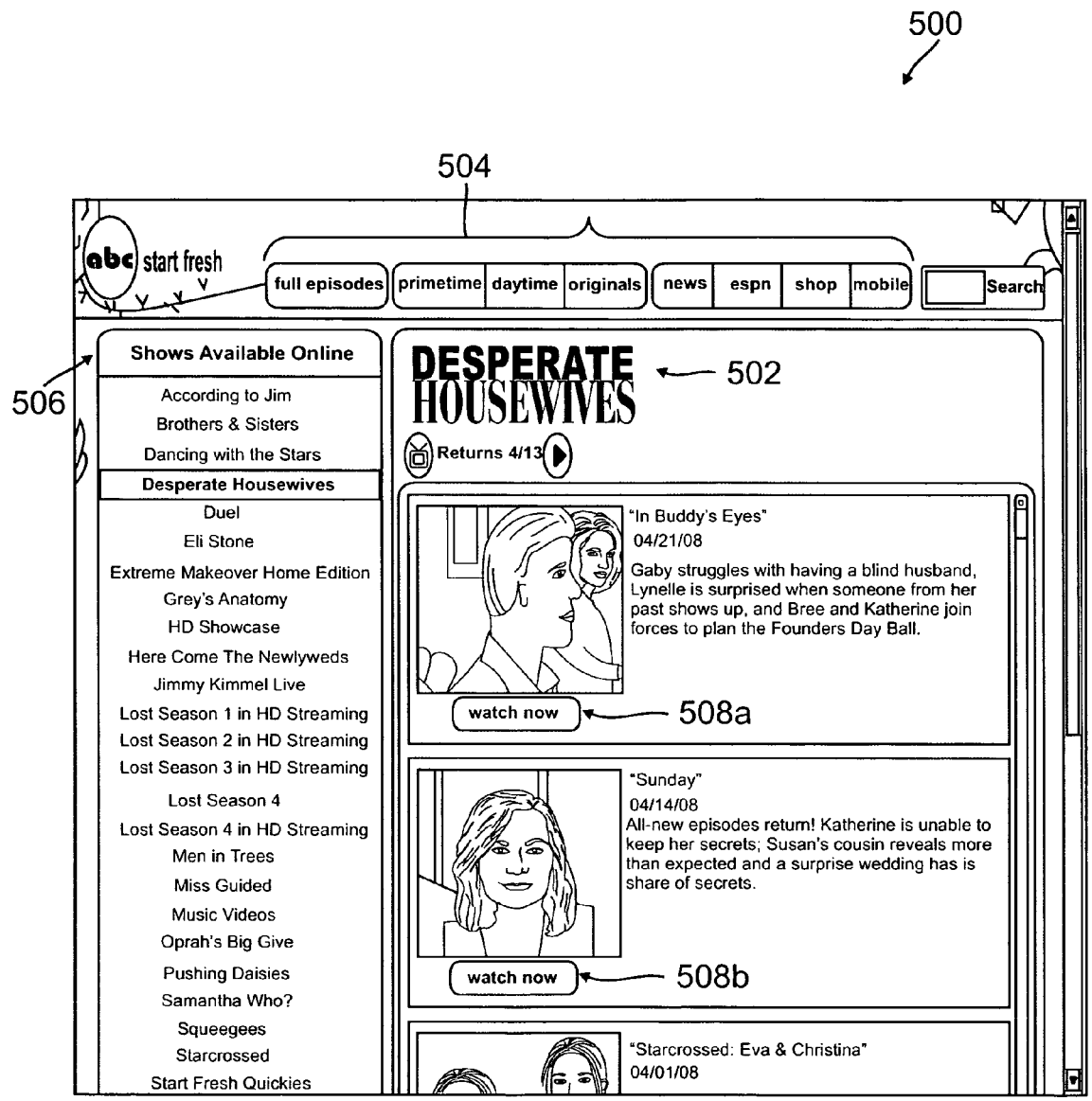
FIG. 5 is a visual frame showing a sample screen display resulting from use of a content navigation module, according to one embodiment of the present invention.

Turning now to FIG. 5 in combination with FIG. 2, FIG. 5 presents visual frame 500 showing a sample screen display resulting from use of content navigation module 240, in conjunction with a computing device, such as computing device 230. In one embodiment, the display shown by FIG. 5 may appear as the result simply of a user connecting content navigation module 240 to computing device 230, with self-executing content control application 242 performing all other necessary operations in combination with resourced available on computing device 230. As shown in FIG. 5, visual frame 500 includes primary display pane 502 dedicated to the ABC drama Desperate Housewives, search bar 504 allowing a user to efficiently locate desired content by category, and menu 506 listing the plurality of selected content available from content provider 212. Content control application 242 can by utilized by the user to access content provider 212 by selecting "watch now" button 508*a* or 508*b*. Alternatively, content control application 242 can be utilized to divert to other content shown on menu 506, or explore various content categories using search bar 504.

Thus, the present application discloses a content navigation module and method. By providing a content navigation module including a content control application configured to self-execute and automate navigation to a content provider, the present disclosure describes an approach that renders accessing content virtually effortless, even for a novice user. By further associating a delivery progress of a partially viewed selected content with an identifier contained in the content navigation module, the present application discloses an approach that frees the user profile from the particular computing device utilized to access the content. As a result, the present invention enables a user to initiate viewing of selected content on one computing device, pause or otherwise interrupt delivery progress of that selected content, and resume a substantially seamless presentation of the selected content at another time, on the same or another computing device.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for use by a content navigation module for managing delivery of content, the method comprising:
communicating an identifier contained in the content navigation module with a first computing device to enable the first computing device to receive a selected content from a presentation server over a network;
receiving a delivery progress of the selected content from the first computing device periodically;
storing the delivery progress received periodically in the content navigation module;
registering the delivery progress stored in the content navigation module prior to losing communication with the first computing device as a pause point of the selected content; and
communicating the identifier contained in the content navigation module and the pause point stored in the content navigation module with a second computing device to enable the second computing device to resume receiving the selected content from the server over the network according to the pause point stored in the content navigation module;
wherein the content navigation module is a portable device separable from the first computing device and the second computing device, and wherein the portable device includes an interface for communication with the first computing device and the second computing device, the interface being at least one of a Universal Serial Bus (USB) interface and a wireless interface.

2. The method of claim 1, wherein the interface is further configured to deliver a desired notification as an alarm relating to a scheduled media presentation.

3. The method of claim 1, wherein the first and the second computing devices are each one of a television system, a mobile telephone, a digital media player, a personal digital assistant (PDA), a wired or wireless computer, a gaming console, and an automobile entertainment system.

4. The method of claim 1, wherein the content navigation module is a USB stick.

5. The method of claim 1, wherein the first computing device and the second computing device are the same computing device.

6. The method of claim 1, wherein the content navigation module does not receive the selected content.

7. A content navigation module for managing delivery of content, the content navigation module comprising:
a memory configured to store an identifier;
an interface configured to communicate the identifier contained in the content navigation module with a first computing device to enable the first computing device to receive a selected content from a presentation server over a network;

the interface further configured to receive a delivery progress of the selected content from the first computing device periodically;

the memory further configured to store the delivery progress received periodically by the interface, wherein the delivery progress stored in the memory prior to losing communication with the first computing device is registered as a pause point of the selected content;

the interface further configured to communicate the identifier contained in the content navigation module and the pause point stored in the content navigation module with a second computing device to enable the second computing device to resume receiving the selected content from the server over the network according to the pause point stored in the content navigation module;

wherein the content navigation module is a portable device separable from the first computing device and the second computing device, and the interface being at least one of a Universal Serial Bus (USB) interface and a wireless interface.

8. The content navigation module of claim 7, wherein the interface is further configured to deliver a desired notification as an alarm relating to a scheduled media presentation.

9. The content navigation module of claim 7, wherein the first and the second computing devices are each one of a television system, a mobile telephone, a digital media player, a personal digital assistant (PDA), a wired or wireless computer, a gaming console, and an automobile entertainment system.

10. The content navigation module of claim 7, wherein the content navigation module is a USB stick.

11. The content navigation module of claim 7, wherein the content navigation module is not configured to receive the selected content.

* * * * *